(12) United States Patent
Fu et al.

(10) Patent No.: US 12,400,341 B2
(45) Date of Patent: Aug. 26, 2025

(54) MACHINE LEARNING FRAMEWORK APPLIED IN A SEMI-SUPERVISED SETTING TO PERFORM INSTANCE TRACKING IN A SEQUENCE OF IMAGE FRAMES

(71) Applicant: NVIDIA Corporation, Santa Clara, CA (US)

(72) Inventors: Yang Fu, Urbana, IL (US); Sifei Liu, Santa Clara, CA (US); Umar Iqbal, San Jose, CA (US); Shalini De Mello, San Francisco, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 658 days.

(21) Appl. No.: 17/570,254

(22) Filed: Jan. 6, 2022

(65) Prior Publication Data
US 2022/0222832 A1   Jul. 14, 2022

Related U.S. Application Data

(60) Provisional application No. 63/135,478, filed on Jan. 8, 2021.

(51) Int. Cl.
*G06T 7/246* (2017.01)
*G06T 7/11* (2017.01)
(Continued)

(52) U.S. Cl.
CPC ............... *G06T 7/248* (2017.01); *G06T 7/11* (2017.01); *G06T 7/73* (2017.01); *G06V 10/764* (2022.01);
(Continued)

(58) Field of Classification Search
CPC ... G06T 7/248; G06T 7/11; G06T 7/73; G06T 2207/10016; G06T 2207/20016;
(Continued)

(56) References Cited

U.S. PATENT DOCUMENTS

| 11,144,726 B2 * | 10/2021 | Chatterjee ................ G06N 3/08 |
| 2016/0042227 A1 * | 2/2016 | Zhong ................... G06V 40/23 |
| | | 382/103 |

(Continued)

FOREIGN PATENT DOCUMENTS

KR   20200023221 A   3/2020

OTHER PUBLICATIONS

Andriluka, M., "Posetrack: A benchmark for human pose estimation and tracking," In Proceedings of the IEEE Conference on Computer Vision and Pattern Recognition, pp. 5167-5176, 2018.
(Continued)

*Primary Examiner* — Gandhi Thirugnanam
(74) *Attorney, Agent, or Firm* — Leydig, Voit & Mayer, Ltd.

(57) ABSTRACT

A method and system are provided for tracking instances within a sequence of video frames. The method includes the steps of processing an image frame by a backbone network to generate a set of feature maps, processing the set of feature maps by one or more prediction heads, and analyzing the embedding features corresponding to a set of instances in two or more image frames of the sequence of video frames to establish a one-to-one correlation between instances in different image frames. The one or more prediction heads includes an embedding head configured to generate a set of embedding features corresponding to one or more instances of an object identified in the image frame. The method may also include training the one or more
(Continued)

prediction heads using a set of annotated image frames and/or a plurality of sequences of unlabeled video frames.

25 Claims, 10 Drawing Sheets

(51) Int. Cl.
    *G06T 7/73*     (2017.01)
    *G06V 10/764*     (2022.01)
    *G06V 10/77*     (2022.01)
    *G06V 10/774*     (2022.01)
    *G06V 10/82*     (2022.01)

(52) U.S. Cl.
    CPC ........ *G06V 10/7715* (2022.01); *G06V 10/774* (2022.01); *G06V 10/82* (2022.01); *G06T 2207/10016* (2013.01); *G06T 2207/20016* (2013.01); *G06T 2207/20081* (2013.01); *G06T 2207/20084* (2013.01); *G06T 2207/30252* (2013.01)

(58) Field of Classification Search
    CPC . G06T 2207/20081; G06T 2207/20084; G06T 2207/30252; G06T 7/246; G06V 10/764; G06V 10/7715; G06V 10/774; G06V 10/82; G06F 18/214; G06F 18/22; G06F 18/241; G06N 3/045; G06N 3/08; G06N 20/00
    See application file for complete search history.

(56) References Cited

U.S. PATENT DOCUMENTS

| | | | |
|---|---|---|---|
| 2017/0061215 A1* | 3/2017 | Son | G06V 20/41 |
| 2019/0297326 A1 | 9/2019 | Reda et al. | |
| 2020/0065976 A1 | 2/2020 | Han et al. | |
| 2020/0202533 A1* | 6/2020 | Cohen | G06T 7/194 |
| 2021/0012116 A1* | 1/2021 | Urtasun | G06F 18/2155 |
| 2021/0133987 A1* | 5/2021 | Suzuki | G06T 7/70 |
| 2022/0222832 A1* | 7/2022 | Fu | G06V 10/82 |
| 2022/0383630 A1* | 12/2022 | Beyer | G06V 10/7747 |
| 2023/0127865 A1* | 4/2023 | Shafik | G06T 7/0002 |
| | | | 382/159 |
| 2023/0229734 A1* | 7/2023 | Troiani | G06F 18/2413 |
| | | | 382/159 |
| 2023/0281979 A1* | 9/2023 | Jia | G06V 10/25 |
| | | | 382/155 |
| 2023/0337636 A1* | 10/2023 | Shmigelsky | G06V 10/25 |
| 2023/0401827 A1* | 12/2023 | Kuen | G06V 10/28 |
| 2024/0012852 A1* | 1/2024 | Mopur | G06V 10/763 |
| 2024/0020963 A1* | 1/2024 | Qian | G06V 10/774 |
| 2024/0070868 A1* | 2/2024 | Yu | G06T 7/11 |
| 2024/0185617 A1* | 6/2024 | Brems | G06V 20/70 |

OTHER PUBLICATIONS

Andriluka, M., et al., "2d human pose estimation: New benchmark and state of the art analysys," In Proceedigns of the IEEE Conference on computer Vision and Pattern Recognition, pp. 3686-3693, 2014.
Deng, J., et al., "Imagenet: A large-scale hierarchical image database," In IEEE Conf. Comput. Vis. Pattern Recog., 2009.
Fang, H., et al., "RMPE: Regional multi-person estimation," in Proceedings of the IEEE International Conference on Computer Vision, pp. 2334-2343, 2017.
He, K., et al., "Deep residual learning for image recognition," In IEEE Conf. Comput. Vis. Pattern Recog., pp. 770-778, 2016.
Lin, T., et al., "Feature pyramid networks for object detection," In IEEE Conf. Comput. Vis. Pattern Recog., 2017.
Lin, T., et al., "Microsoft coco: Common objects in context," In Eur. Conf. Comput. Vis., 2014.
Ning, G., et al., "Lighttrack: A generic framework for online top-down human pose tracking," In Proceedings of the IEEE/CVF Conference on Cmoputer Vision and Pattern Recognition Workshops, pp. 1034-1035, 2020.
Pang, J., et al., "Quasi-dense instance similarly learning," arXiv preprint arXiv:2006.06664, 2020.
Sun, K., et al., "Deep high-resolution representation learning for human pose estimation," In Proceedings of the IEEE conference on computer vision and pattern recognition, pp. 5693-5703, 2019.
Wang, X., et al., "Solo: Segmenting objects by locations," Eur. Conf. Comput. Vis., 2020.
Wei, F., et al., "Point-set anchors for object detection, instance segmentation and pose estimation," Eur. Conf. Comput. Vis., 2020.
Xu, N., et al., "Youtube-vos: A large-scale video object segmentation benchmark," arXiv preprint arXiv:1809.03327, 2018.
Yang, L., et al., "Video instance segmentation," In Int. Conf. Comput. Vis., 2019.
Bochinski, E., "High-speed tracking-by-detection without using image information," In 2017 $14^{th}$ IEEE Int'l Conf. on Advanced Video and Signal Based Surveillance, pp. 1-6, 2017.
Cao, J., et al., "Sipmask: Spatial information preservation for fast instance segmentation," Proc. Eur. Conf. on Comput. Vis., 2020.
Chen, K., et al., "Mmdetection: Open mmlab detection toolbox and benchmark," arXiv preprint arXiv:1906.07155, 2019.
Chen, T. et al., "A simple framework for contrastive learning of visual representations," arXiv preprint arXiv:2002.05709, 2020.
Dong, M., et al., "Temporal feature augmented network for video instance segmentation," In Proceedings of the IEEE International Conference on Computer Vision Workshops, 2019.
Fernando, B., et al., "Self-supervised video representation learning with odd-one-out networks," In Proceedings of the IEEE Conference on Computer Vision and Pattern Recogntiion, pp. 3636-3645, 2017.
Girdhar, R., et al., "Detect-and-track: Efficient pose estimation in videos," In Proceedings of the IEEE Conference on Computer Vision and Pattern Recognition, pp. 350-359, 2018.
Grill, J., et al., "Bootstrap your own latent—a new approach to self-supervised learning," Advances in Neural Information Processing Systems, 33, 2020.
Guo, H., "Multi-domain pose network for multi-person pose estimation and tracking," In Proceedings of the European Conference on Computer Vision, 2018.
Hwang, J., et al., "Pose estimator and tracker using temporal flow maps for limbs," In 2019 International Joint Conference on Neural Networks, pp. 1-8, 2019.
Jabri, A., et al., "Space-time correspondence as a constrastive random walk," Advances in Neural Information Processing Systems, 33, 2020.
Khosla, P., et al., "Supervised contrastive learning," arXiv preprint arXiv:2004.11362, 2020.
Kong, T., et al., "Fovebox: Beyond anchor-based object detector," IEEE Transactions on Image Processing, pp. 7389-7398, 2020.
Li, X., et al., "Joint-task self-supervised learning for temporal correspondence," In Advances in Neural Information Processing Systems, pp. 318-328, 2019.
Luiten, J., et al., "Video instance segmentation 2019: A winning approach for combined detection, segmentation, classification and tracking," In Proceedings of the IEEE Int'l Conf. on Comput. Vis. Workshops, 2019.
Misra, I., et al., "Shuffle and learn: unsupervised learning using temporal order verification," In Eur. Conf. on Comput. Vis., pp. 527-554, Springer, 2016.
Ning, G., et al., "A top-down approach to articulated human pose estimation and tracking," In Proceedings of the Eur. Conf. on Comput. Vis., 2018.
Van Den Oord, A., et al., "Representation learning with contrastive predictive coding," arXiv preprint arXiv:1807.03748, 2018.
Pont-Tuset, J., et al., "The 2017 davis challenge on video object segmentation," arXiv:1704.00675, 2017.

(56) References Cited

OTHER PUBLICATIONS

Raaj, Y., et al., "Efficient online multi-person 2d pose tracking with recurrent spatio-temporal affinity fields," In Proceedings of the IEEE Conf. on Comput. Vis. and Pattern Recognition, pp. 4620-4628, 2019.
Ruggero, M., et al., "Benchmarking and error diagnosis in multi-instance pose estimation," In Proceedings of the IEEE Int'l Conf. on Comp. Vis., pp. 369-378, 2017.
Snower, M., et al., "15 keypoints is all you need," In Proceedings of the IEEE/CVF Conf. on Comput. Vis. and Pattern Recognition, pp. 6738-6748, 2020.
Vyas, A., et al., "Out-of distribution detection using an ensemble of self- supervised leave-out classifiers," In Proceedings of the Eur. Conf. on Comput. Vis., pp. 550-564, 2018.

\* cited by examiner

MACHINE LEARNING FRAMEWORK APPLIED IN A SEMI-SUPERVISED SETTING TO PERFORM INSTANCE TRACKING IN A SEQUENCE OF IMAGE FRAMES

CLAIM OF PRIORITY

This application claims the benefit of U.S. Provisional Application No. 63/135,478, filed on Jan. 8, 2021, the entire contents of which is incorporated herein by reference.

BACKGROUND

Instance segmentation refers to the analysis of images or frames in a video in order to assign labels to various objects in the image. For example, an image can be analyzed to classify the background objects and the foreground objects in the image such that each pixel belongs to a group of pixels associated with either the background or the foreground. In addition, separate objects in the foreground of the image can be labeled with separate classifications, for example, to differentiate different people in the image or to separately label a person and a car as separate instances of different objects in the image. Tracking segmentation masks of multiple instances across multiple frames of a video has been studied intensively, but still faces two fundamental challenges: (1) a requirement for large-scale, frame-wise annotation; and (2) the complexity of two-stage approaches in use today.

Many existing approaches to this challenge utilize machine learning algorithms that rely on fully-supervised learning techniques. In order to train these algorithms, a set of training data that includes fully annotated sets of image frames across a video is required. Because annotations of videos, especially in a per-frame manner, requires extensive manual labor, the fully supervised learning technique becomes a challenging issue.

Self-supervised approaches have also been developed to learn pixel-level video correspondences from a large set of unlabeled videos. The learned correspondences can be used to track any fine-grained attributes (e.g., segmentation masks, keypoints, and/or textures) on a per-pixel basis; however, these approaches are semantically-independent, meaning that the approaches do not discriminate between instances of different objects. In other words, the video can be processed to create segmentation maps of each frame, but the different objects in each frame are not tracked from one frame to the next, nor is there any attempt to establish a correspondence between an instance of an object in one frame and an instance of that same object in another frame, even when the appearance or pose of that object may change over time.

Each of these techniques suffers from certain limitations. Thus, there is a need for improving automated techniques for tracking instances across a sequence of video frames.

SUMMARY

Embodiments of the present disclosure relate to a method and system for tracking instances within a sequence of video frames. A machine learning framework is defined and trained in a semi-supervised manner with a set of annotated image frames and/or a set of unlabeled sequences of video frames. Embedding features for each instance in a sequence of video frames can be predicted and utilized to track unique instances across a sequence of video frames.

In accordance with a first aspect of the present disclosure, a method if provided that includes the steps of: processing an image frame by a backbone network to generate a set of feature maps, processing the set of feature maps by one or more prediction heads, and analyzing the embedding features corresponding to a set of instances in two or more image frames of the sequence of video frames to establish a one-to-one correlation between instances in different image frames. The one or more prediction heads includes an embedding head configured to generate a set of embedding features corresponding to one or more instances of an object identified in the image frame. The method may also include training the one or more prediction heads using a set of annotated image frames and/or a plurality of sequences of unlabeled video frames.

In an embodiment of the first aspect, the one or more prediction heads further comprises: a classification head configured to predict a location of zero or more instances of each of a plurality of classes of objects in the image; and a mask head configured to predict a pixel level segmentation mask for each instance in the image.

In an embodiment of the first aspect, the embedding head comprises a keypoint embedding head including an encoder-decoder structure, wherein the encoder-decoder structure includes an encoder comprising a convolutional layer and a decoder comprising a de-convolutional layer.

In an embodiment of the first aspect, the one or more prediction heads comprise a classification head and a shape regression head configured to estimate a pose estimation for each instance based on a plurality of keypoints.

In an embodiment of the first aspect, the backbone network comprises a feature pyramid network, and wherein the set of feature maps comprises a plurality of feature maps of different spatial resolution.

In an embodiment of the first aspect, the method further includes training the one or more prediction heads using a set of annotated image frames and/or a plurality of sequences of unlabeled video frames.

In an embodiment of the first aspect, training the embedding head comprises minimizing an instance contrastive loss term.

In an embodiment of the first aspect, training the embedding head further comprises enforcing maximum entropy regularization for a similarity matrix.

In an embodiment of the first aspect, training the embedding head comprises minimizing a cycle loss term calculated based on a forward affinity matrix and a reverse affinity matrix corresponding to a sequence of video frames.

In accordance with a second aspect of the present disclosure, a system is provided for tracking instances within a sequence of video frames. The system includes a non-transitory computer-readable memory and at least one processor configured to implement a plurality of neural networks. The neural networks include a backbone network configured to process an image frame and generate a set of feature maps and one or more prediction heads configured to process the set of feature maps generated by the backbone network. The one or more prediction heads includes an embedding head configured to generate a set of embedding features corresponding to one or more instances of an object identified in the image frame.

In an embodiment of the second aspect, the one or more prediction heads further comprises: a classification head configured to predict a location of zero or more instances of each of a plurality of classes of objects in the image; and a mask head configured to predict a pixel level segmentation mask for each instance in the image.

In an embodiment of the second aspect, the embedding head comprises a keypoint embedding head including an encoder-decoder structure, wherein the encoder-decoder structure includes an encoder comprising a convolutional layer and a decoder comprising a de-convolutional layer.

In an embodiment of the second aspect, the one or more prediction heads comprise a classification head and a shape regression head configured to estimate a pose estimation for each instance based on a plurality of keypoints.

In an embodiment of the second aspect, the backbone network comprises a feature pyramid network, and wherein the set of feature maps comprises a plurality of feature maps of different spatial resolution.

In an embodiment of the second aspect, the method further includes training the one or more prediction heads using a set of annotated image frames and/or a plurality of sequences of unlabeled video frames.

In an embodiment of the second aspect, training the embedding head comprises minimizing an instance contrastive loss term and enforcing maximum entropy regularization for a similarity matrix.

In an embodiment of the second aspect, training the embedding head comprises minimizing a cycle loss term calculated based on a forward affinity matrix and a reverse affinity matrix corresponding to a sequence of video frames.

In an embodiment of the second aspect, the at least one processor comprises a parallel processing unit.

In an embodiment of the second aspect, the system is included in an autonomous vehicle.

In accordance with a third aspect of the present disclosure, a non-transitory computer-readable medium is provided storing instructions that, responsive to execution by one or more processors, cause a computing system to track instances within a sequence of video frames by performing the method of the first aspect of the present disclosure.

BRIEF DESCRIPTION OF THE DRAWINGS

The present systems and methods for tracking instances in a sequence of video frames are described in detail below with reference to the attached drawing figures, wherein.

DETAILED DESCRIPTION

Figure 1A:
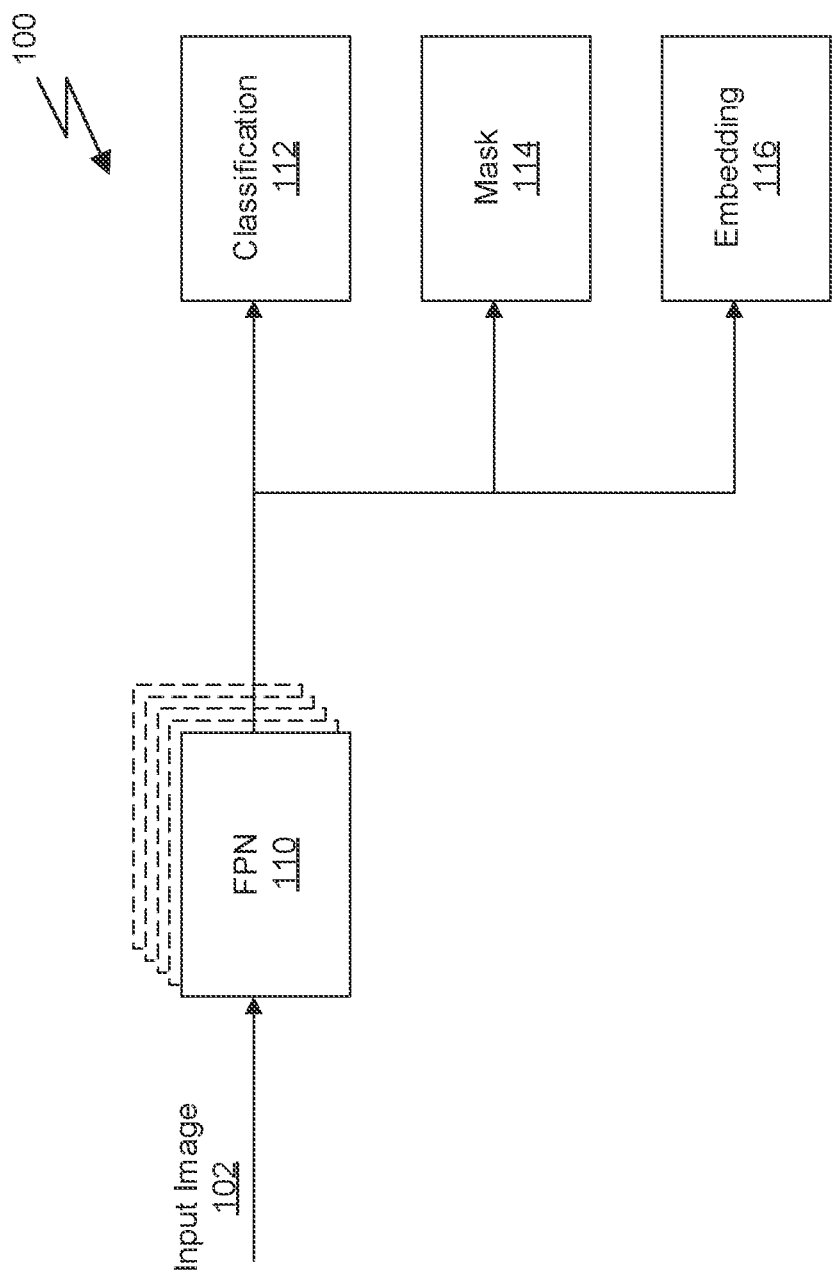
FIG. 1A illustrates a machine learning framework, in accordance with some embodiments.

A machine learning framework is described in the present disclosure for learning a discriminative representation of different instances in a sequence of video frames. Specifically, a prediction head that includes a number of convolutional layers followed by a group of normalization layers is proposed and configured to take the feature map of one or more fully connected networks as input to the prediction head. The machine learning framework is trained using only an annotated (i.e., labeled) image dataset and, optionally, unlabeled video sequences.

Instance segmentation requires identification and classification of all objects in an image while simultaneously semantically segmenting each instance of the objects at a pixel level. Objects in an image belong to a fixed set of semantic classifications, but the number of instances of each object varies. For example, an image may include a number of objects, wherein at least one object is classified as a dog. However, multiple dogs in the same image, while sharing a common classification as being of the same type of object, are each a separate instance. The dogs may look the same or share some similar features, but even identical objects at different locations in the image may be separate instances.

Recent instance segmentation techniques can be categorized into two groups: top-down and bottom-up paradigms. The top-down approach first detects bounding boxes for each object and then segments the instance mask within each bounding box. The bottom-up approach learns an affinity relation, assigning an embedding vector for each pixel, by pushing away the embedding vector for pixels belonging to different instances and pulling the embedding vectors closer for pixels belonging to the same instance. Post-processing (e.g., clustering based on the embedding vectors) is then needed to separate the various instances identified in the image.

SOLO is an instance segmentation solution utilizing the bottom-up approach, which is spatially variant and directly predicts both semantic categories and segmentation of the object instance at each corresponding location. SOLO is described in Wang et al., "Solo: Segmenting object by locations," Eur. Conf. Comput. Vis., 2020, which is herein incorporated by reference in its entirety. SOLO uses a fully connected network that feeds into parallel prediction heads, a first prediction head used to predict the semantic category associated with each location in an S×S grid and a second prediction head used to predict the instance mask for each location. The denser the selected grid, the greater the number of individual instances of an object that can be predicted within an image.

The framework described in SOLO can be adapted to the instant problem for tracking instances across a sequence of video frames. It will be appreciated that the SOLO framework is only trained to perform instance segmentation on single frames and is not trained to track instances as instances move across the frame (i.e., varying the instance location) and potentially change appearance (due to the instance motion) over time. Consequently, the instance tracking problem lends itself to not only tracking different instances of multiple object classifications across varying locations in a particular frame, but also tracking the same instance across varying locations in multiple frames.

Conventional techniques for supervised learning of instance segmentation networks treats the problem as a multi-class classification problem. However, in the instant case, because the training dataset lacks ground truth association labels (i.e., frame-by-frame image annotations), instead the network is trained to learn a feature map (e.g., an embedding tensor) that is discriminative of different instances and robust to appearance variation caused by motion of instances in videos. Once trained, the network can be used to track any object instance utilizing its embedding feature to search for the most similar object in the subsequent frame.

Instance segmentation is a core technique utilized in many autonomous driving applications. An autonomous vehicle can include a machine learning framework configured to process images captured by one or more image sensors included in the vehicle. The techniques described herein can be used to track instances of objects captured in the video sequences to perform, e.g., collision avoidance or the like. Instance segmentation can be useful in other types of applications as well, such as in security applications or sports applications.

FIG. 1A illustrates a machine learning framework 100, in accordance with some embodiments. As shown in FIG. 1A, the framework 100 includes a backbone network coupled to a plurality of prediction heads. In an embodiment, the backbone network is a feature pyramid network (FPN) 110. The FPN 110 may include a number of convolution layers arranged in a pyramid, where each level of the pyramid includes one or more layers and generates feature maps at a particular resolution. The feature maps may be down-sampled at each level of the pyramid (e.g., via a stride operation or a pooling layer) to produce feature maps of smaller spatial resolution compared to the original input image. In an embodiment, the FPN 110 may include skip-connections and a top-down structure with upsampling layers as described in Lin et al., "Feature Pyramid Networks for Object Detection," Comp. Vis. And Pattern Recognition, 2016, which is incorporated by reference herein in its entirety.

The FPN 110 takes an input image 102 and generates a set of feature maps at different spatial resolutions and a fixed number of channels (e.g., 256 channels). For example, an input image at 256×256 pixels may result in a set of feature maps having 256×256, 128×128, 64×64, 32×32, and 16×16 spatial resolution, each having 256 channels. It will be appreciated that the image sizes described above are merely examples and different embodiments may implement different configurations of the FPN 110.

The set of feature maps is then passed to a number of prediction heads. As shown in FIG. 1A, the prediction heads include a classification head 112, a mask head 114, and an embedding head 116. The classification head 112 includes a plurality of convolution layers (e.g., 7 convolution layers) that generate feature maps having C channels, each feature map of size S×S representing an initial division of the image spatial domain into a grid of cells. In some embodiments, the classification head 112 may also include interpolation layers between each convolution layer or subsequent to the convolution layers. The feature maps generated by the classification head 112 represent a prediction of the location of instances for C classes of objects in the image frame. More specifically, an image is divided into an S×S grid and the output of the classification head 112 provides a prediction of whether each cell in the grid is associated with an object of a particular classification. The output of the classification head 112 is therefore a map of S×S×C values (e.g., between 0 and 1) that represent a confidence level that the grid cell of the image contains an object of each corresponding classification. In an embodiment, the size of C is fixed at 256, which provides for a fixed number of classes for the objects in the image. In some embodiments, the output of the classification head 112 is analyzed using a softmax function to determine which class of object is located in each cell of the grid.

It will be appreciated that the size of the selected grid (i.e., $S^2$) limits the total number of instances of various objects that can be detected within an image. A single channel of the output of the classification head 112 is a map of values that indicates which cells in the grid contain an object corresponding to a particular class. Creating a grid that is too coarse limits the total number of objects that can be identified within the image. However, creating a grid that is too fine can increase the complexity of the framework 100, requiring more processing capacity to process an image. In addition, different grid sizes can be utilized for each level of the pyramid of feature maps generated by the FPN 110. By using a set of feature maps having a pyramid structure of spatial resolution rather than a set of feature maps at a single scale, objects of different sizes are more likely to be correctly predicted. It will be appreciated that a different instance of the classification head 112 can be instantiated for each level of the pyramid to process the feature maps having a corresponding spatial resolution to that instance of the classification head 112.

The mask head 114 predicts a pixel level segmentation mask for each instance of an object located in each grid. The mask head 114 may also be comprised of a number of convolution layers and/or interpolation layers. The output of the mask head 114 is a set of feature maps of size $H \times W \times S^2$ that predicts a pixel level segmentation mask for each instance of an object identified in a particular grid location. Again, different instances of the mask head 114 can be instantiated for each level of the pyramid in the set of feature maps generated by the FPN 110. It will be appreciated that, in one embodiment, the segmentation masks at each level of the pyramid may be up-sampled to the original resolution of the image. In an embodiment, the set of feature maps provided as input to the mask head 114 is augmented by spatial information (i.e., x and y pixel coordinate locations). These two additional channels are concatenated onto the set of feature maps output by the FPN 110 and provide at least one convolution layer in the mask head 114 with additional spatial information that is only explicitly included in the structure of the feature maps.

The classification head 112 and the mask head 114 may be trained using a training data set that includes image frames with annotations. Annotations may refer to a segmentation mask for each of one or more instances of objects identified in an image, as well as a classification associated with each instance.

In addition to the classification head 112 and the mask head 114, which provide an identification of the category of each instance and a corresponding pixel-level correspondence (i.e., segmentation map) for each identified instance, the framework 100 also includes another prediction head used to track instances across a sequence of frames. In order to track instances across a sequence of video frames, an embedding vector is predicted for each identified instance and a similarity of embedding vectors of the instances identified in separate frames is used to predict a correspondence between instances across a sequence of video frames.

In an embodiment, the embedding head 116 provides a tracking feature that is (1) discriminative of different instances within an image, and (2) consistent across variations of an instance commonly present in video sequences. The structure of the embedding head 116 is similar to the classification head 112, including a plurality of convolution layers. However, the embedding head 116 is trained using a combination of center and contrastive losses as described in more detail below.

In an embodiment, the embedding head 116 is implemented with four convolutional layers with 256 output channels. The convolutional layers are followed by one or more group normalization layers. It will be appreciated that, in some embodiments, the embedding head 116 can be designed to have greater or fewer convolutional layers and that the group normalization layers can be omitted or replaced with other types of layers.

A center representation of an instance i is obtained by averaging all embedding features assigned to a given instance, given as:

$$C_i = \frac{1}{N_i} \sum_{q \in \Omega_i} f_q, \qquad \text{(Eq. 1)}$$

where $\Omega_i$ is the set of grid cells in the image, $N_i$ is the number of grid cells in $\Omega_i$, and $f_q$ is the feature vector for a particular cell q. A center loss that minimizes L1 distance is then defined as:

$$\mathcal{L}_i^{center} = \Sigma_{q \in \Omega_i} \|C_i - f_q\|_1, \qquad \text{(Eq. 2)}$$

The objective of minimizing the center loss term during training forces the embedding feature vectors of the same instance, but located in different cells of the grid, to be similar. However, the embedding feature vectors for different instances also need to be distinct in order to have strong discriminative ability. Thus, a contrast term is also defined to push the center representation of all instances further apart. In particular, a dense similarity matrix is calculated as follows:

$$S(i, j) = \frac{\exp(C_i^T \cdot C_j)}{\sum_{k=0}^{K} \exp(C_i^T \cdot C_k)}, \qquad \text{(Eq. 3)}$$

In Equation 3, the variables i and j refer to the different instances identified in an image, the image having K total instances of objects identified therein. To push apart the embedding vectors for different instances, the elements on the diagonal of the matrix are encouraged to be larger than the off-diagonal elements. A cross entropy loss is then defined, given as:

$$\mathcal{L}^{contra} = CE(S, I), \qquad \text{(Eq. 4)}$$

where I is an identity matrix. The total instance contrastive loss is then the combination of the sum of center losses for each instance and the cross entropy loss, given as:

$$\mathcal{L}^{IC} = \Sigma_{i=0}^{K} \mathcal{L}_i^{center} + \lambda \mathcal{L}^{contra}, \qquad \text{(Eq. 5)}$$

where $\lambda$ is a parameter for the relative strength of contrastive loss term.

Once the embedding head 116 is trained to predict embedding features for the different instances identified in the cells of the grid, the center representations can then be used to track instances across frames by comparing each of the center representations predicted in one frame to the center representations in another frame. In addition, tracking can also be improved by utilizing information from the classification head 112 during training, as will be discussed below utilizing a non-maxima suppression technique.

In an embodiment, the center representations for each instance, along with the classification and segmentation masks, can be stored in a data structure in a memory as each frame of video is processed. Once multiple frames of video are processed, the center representations for instances in the sequence of frames are compared via, e.g., a cosine similarity value to identify instance correlations across the sequence of video frames.

Tracking via instance contrastive loss alone is based on an assumption that any instance in the current frame also exists in an adjacent frame. However, this fails to recognize newly emerging instances as they enter a subsequent frame or instances in one frame that may be occluded or out of view in a subsequent frame. When calculating a similarity score based on the embedding feature for an instance, a newly emerging instance is potentially going to match with one or more of the existing instances and, consequently, there may be an incorrect match predicted across frames. One technique to resolve this issue is to apply an entropy maximization term in addition to minimizing the instance contrastive loss term.

An entropy term is defined as follows:

$$H = -\Sigma_i^K \Sigma_{j \ne i}^K S(i,j) \log(S(i,j)), \qquad \text{(Eq. 6)}$$

where K is the number of instances in the image and S(i, j) is the dense similarity matrix described in Equation 3. A high entropy value H indicates uniform output probability and, when enforced with the total instance contrastive loss term $\mathcal{L}^{IC}$, will encourage each instance to be equally dissimilar to all other instances. Thus, an additional objective of maximizing the entropy term can be enforced during training in addition to minimizing the instance contrastive loss term.

When a new instance is successfully detected, the embedding feature for the new instance is compared to the embedding feature for the existing K instances. The maximum entropy term enforces the similarity scores to be equally low for all existing instances and, therefore, it is easy to assign a new identity to a newly discovered instance when all similarity scores are below a threshold value.

Figure 1B:
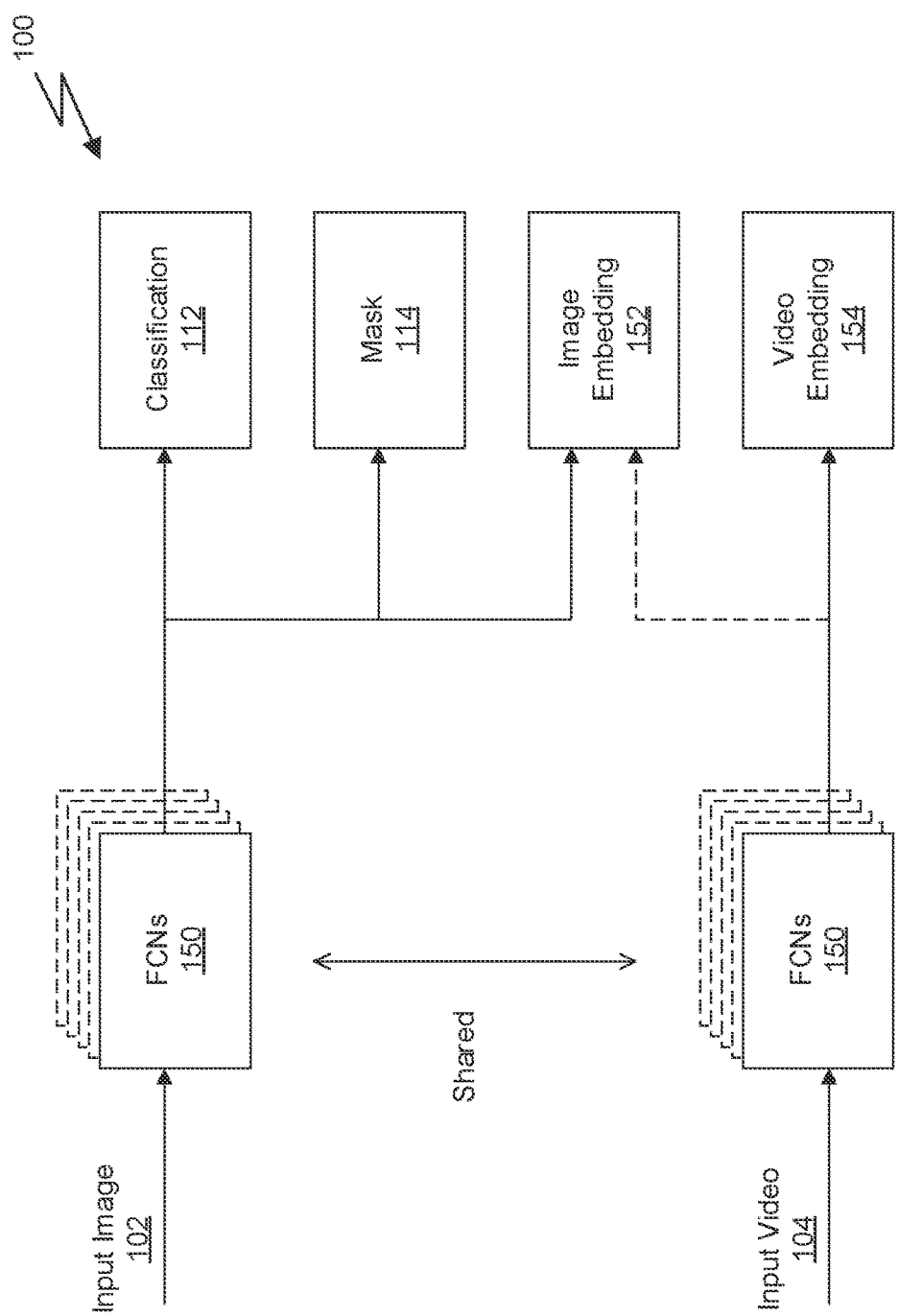
FIG. 1B illustrates a machine learning framework, in accordance with other embodiments.

FIG. 1B illustrates the machine learning framework 100, in accordance with some embodiments. The machine learning framework 100 of FIG. 1A can be trained entirely based on a training data set including only annotated images. For example, the instance contrastive loss term and the maximum entropy terms used for training the parameters of the embedding head 116 only rely on analysis of a single image and the similarity of the embedding features for each instance in the image compared with the similarity score for other instances identified in the same image. However, there is no guarantee that the training performed based on a collection of images will result in tracking that is continuous and coherent over time. In some embodiments, it may be possible to improve the tracking by training the machine learning framework 100 using a training data set that includes unlabeled sequences of video frames. Self-supervised video correspondence learning can be leveraged to regularize the tracking of predicted instances across a sequence of video frames.

As shown in FIG. 1B, the machine learning framework 100 can be extended to be applied to both an input image 102 and an input video 104, where the input image 102 may include a single frame including annotations of the instances in the frame, and the input video 104 may include a plurality of frames in a sequence of video frames, but lacking any ground truth annotation information. Each of the input images 102 and/or the frames of the input videos 104 are processed by the backbone networks, which in FIG. 1B are described as fully convolutional networks (FCNs) 150. The FCNs 150 may be shared (i.e., the structure and parameters of the networks are common to all instances of the FCNs 150) and utilized to process both the input images 102 and the individual frames in the sequence of frames of the input videos 104. In an embodiment, the FCNs 150 are implemented as a feature pyramid network, as described above in FPN 110 of FIG. 1A.

The machine learning framework 100 of FIG. 1B includes a classification head 112 and a mask head 114, as described above. However, the embedding head 116 may be split into a pair of embedding heads: an image embedding head 152 and a video embedding head 154. The image embedding head 152 may be similar to the embedding head 116, described above. The video embedding head 154 is similar in structure to the image embedding head 152, but may be trained using a different technique.

Specifically, valid grid cells can be identified through a non-maxima suppression (NMS) on the matches with higher classification response, based on the output of the classification head 112. Grid-cell level video correspondence can be trained within the valid grid cells through a cycle consistency loss factor. In particular, given a group of frames randomly sampled from one sequence of video frames, a cross-instance affinity $A \in \mathbb{R}^{P \times Q}$ is defined, where P and Q are the number of instances identified in each of two frames of video. A forward affinity matrix $A_t^{t+1}(i,j)$ is the transition probability of the $i^{th}$ instance at time t being matched with the $j^{th}$ instance at time t+1. A long range correspondence given by the chain rule is defined as follows:

$$\overline{A}_t^{t+k} = \Pi_{i=0}^{k-1} A_{t+i}^{t+i+1}, \quad \text{(Eq. 7)}$$

Ideally, if the video sequence is reversed and the instances are tracked from time t+k to time t, then the $i^{th}$ instance should return to its original position in the first frame. A reverse affinity matrix $A_{t+1}^{t}(i,j)$ and a corresponding long range correspondence follow similar to Equation 7. A cycle loss term based on the long range correspondence for both the forward and reverse affinity matrices is then defined as follows:

$$\mathcal{L}^{cyc} = CE(\overline{A}_t^{t+k} \overline{A}_{t+k}^{t}, I), \quad \text{(Eq. 8)}$$

It was discovered that, when the image data sets and the video data sets used for training the machine learning framework 100 share a domain (e.g., where the video sequences include key frames with annotations but most of the frames are not annotated), then the image embedding head 152 can be trained using the unannotated sequence of video frames and adding the cyclic loss term to objective of minimizing the instance contrastive loss term and/or the enforcement maximum entropy objective. However, where the image data sets and the video data sets used for training do not share a domain (i.e., the video sequences are not annotated and the annotated image data is unrelated to the video sequences), then a separate and distinct video embedding head 154 can be trained via the cyclic loss term. The dashed line in FIG. 1B indicates that the image embedding head 152 is not used to process the video sequences when a domain gap exists in the training data set. It will be appreciated that training via the video embedding head 154 with unlabeled videos will also help improve the training of the backbone network such as FPN 110. Even if the video embedding head 154 is not used (i.e., is disabled) during inferencing, the backbone network will produce better features for the image embedding head 152 to process by being trained in tandem with the video embedding head 154 using the unlabeled videos.

Figure 2:
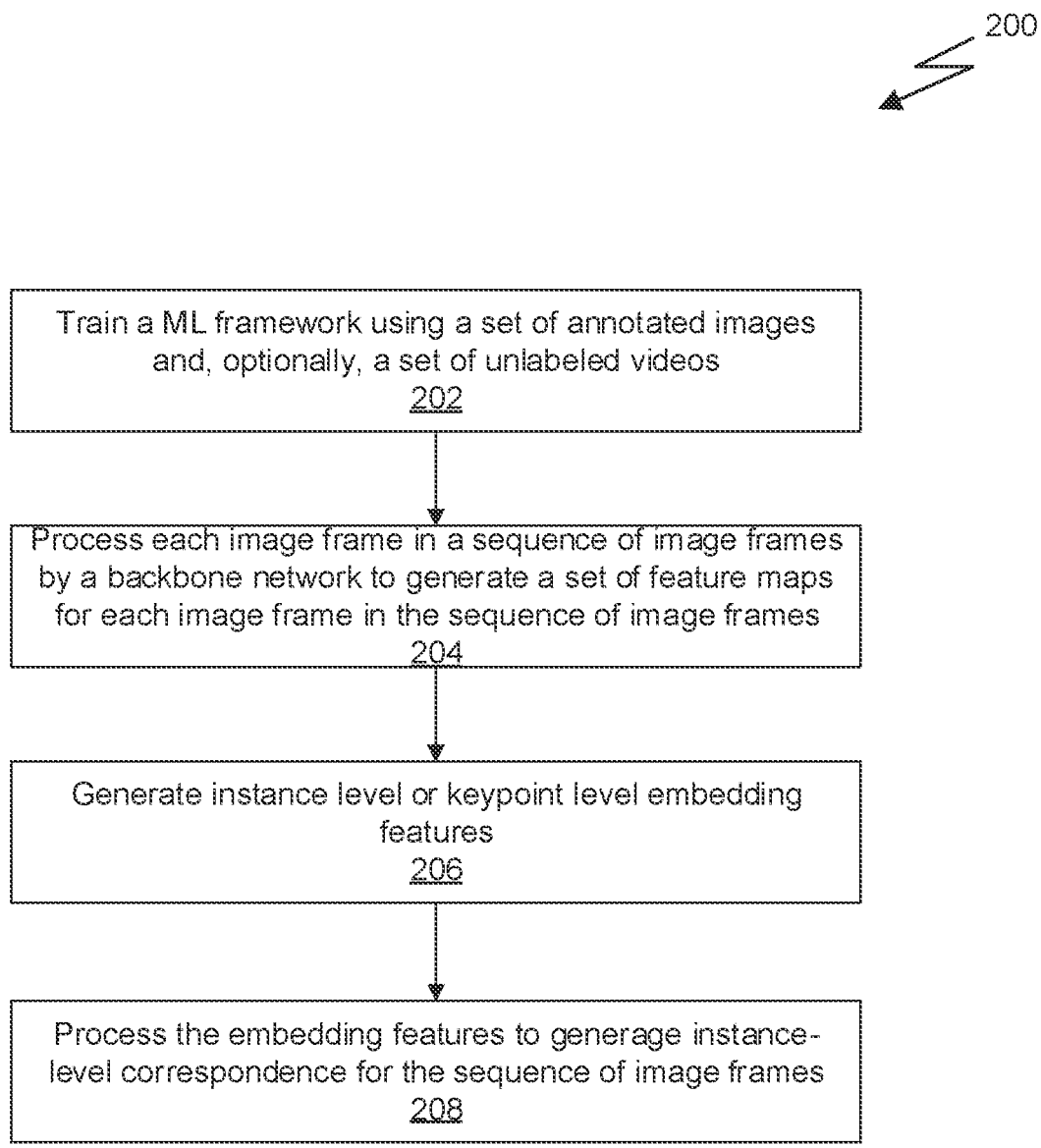
FIG. 2 illustrates a flowchart of a method for performing instance tracking across a sequence of image frames, in accordance with some embodiments.

FIG. 2 illustrates a flowchart of a method 200 for performing instance tracking across a sequence of image frames, in accordance with some embodiments. The method 200 can be performed by software (i.e., process or application), hardware, or some combination of software and hardware. In an embodiment, the method 200 is performed, at least in part, by processing the various layers of the machine learning framework 100 on a parallel processing unit, such as PPU 400 described below.

At step 202, a machine learning framework is trained using a set of annotated images and, optionally, a set of unlabeled videos. In an embodiment, each annotated image comprises an image, a per-pixel segmentation map for the image that identifies one or more instances in the image, and classifiers for each instance of the segmentation map. Each unlabeled video comprises a sequence of image frames, where no annotations or other semantic information (e.g., a segmentation map) is included for the image frames.

In an embodiment, the machine learning framework is trained using an instance contrastive loss function that is a combination of center and contrastive losses. The loss function may also include a term to apply maximum entropy regularization that helps to detect when new objects appear in subsequent image frames of the video. Finally, the loss function includes a cross-entropy loss term related to per-instance affinity matrices that helps to ensure that correspondence between instances is the same in both a forward time direction and a reverse time direction.

At step 204, each image frame in a sequence of image frames is processed by a backbone network to generate a set of feature maps. In an embodiment, the backbone network comprises a FPN 110 and the set of feature maps includes feature maps at a plurality of different sizes or resolutions.

At step 206, the set of feature maps are processed by one or more prediction heads to generate at least one of a segmentation mask, classifiers, instance level embedding features, and/or keypoint level embedding features. In an embodiment, instances of objects of a plurality of different classes can be identified in an image frame. Segmentation masks for each instance are estimated to predict the pixel-level associations to each instance in the image frame. In another embodiment, a set of keypoints (e.g., three dimensional (3D) points) is estimated for each instance of an object.

In an embodiment, an embedding head 116 is provided to process the set of feature maps and generate the instance level embedding features. The embedding head 116 is trained to estimate an embedding feature associated with each instance identified in the image by the classification head 112. In another embodiment, a keypoint embedding head 300 is provided to process the set of feature maps and generate the keypoint level embedding features. The keypoint embedding head 300 is trained to estimate an embedding feature associated with each keypoint associated with one or more instances of objects in the image frame.

At step 208, the embedding features are processed to generate instance-level correspondence for the sequence of image frames. The instance-level correspondence assigns semantic labels to the different instances across the sequence of image frames and tracks the same instances across multiple image frames.

Figure 3:
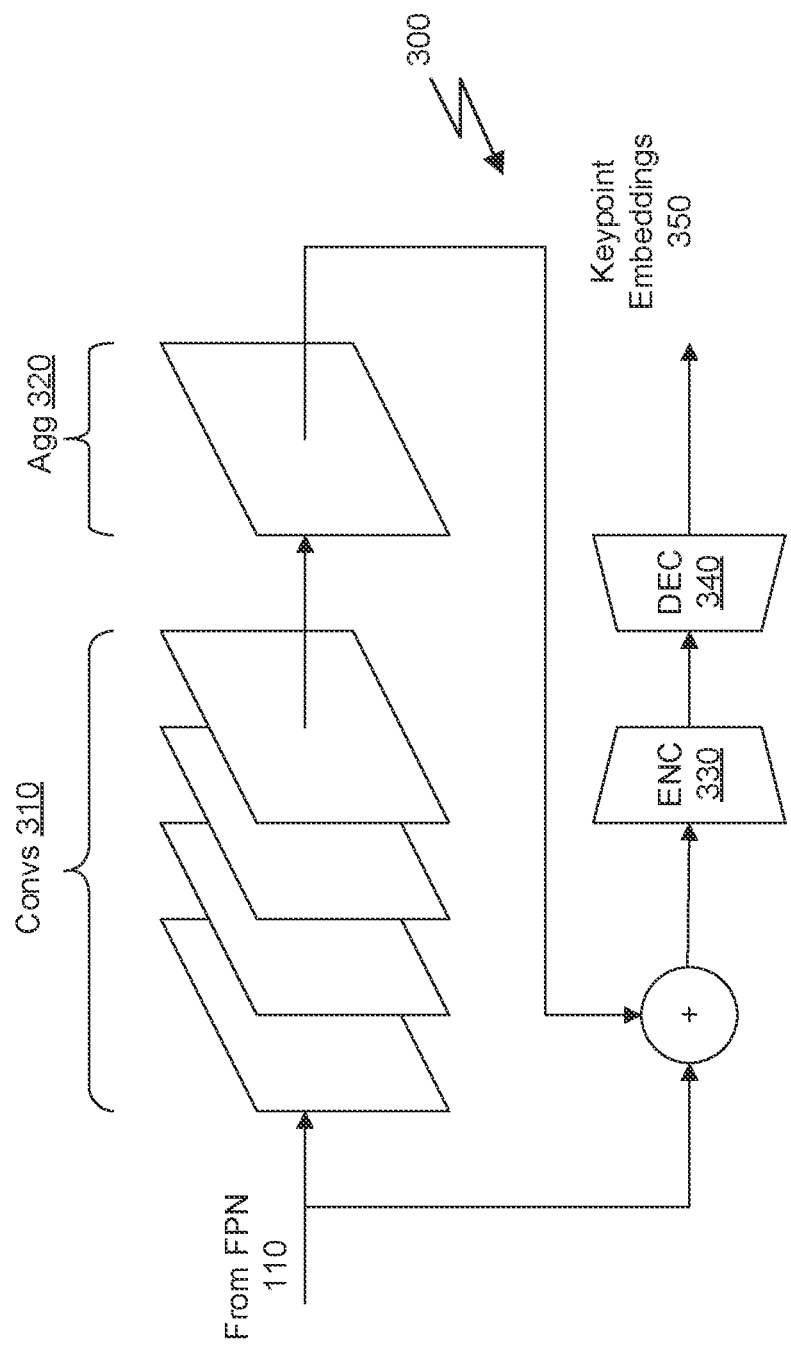
FIG. 3 illustrates a keypoint embedding head that is included in the machine learning framework of FIG. 1, in accordance with some embodiments.

FIG. 3 illustrates a pose tracking prediction head for the machine learning framework 100, in accordance with some embodiments. The machine learning framework 100 of FIG. 1A can be further adapted to predict and track a pose of different humans or other objects (e.g., animals), which are instances of the same class. Pose tracking, or tracking the location of keypoints of an object, is a slightly different problem than instance segmentation as it not only requires determining which pixels belong to a particular instance by estimating a segmentation map for the instance, but locating within the footprint of an instance the predicted location of one or more keypoints. Compared to instance segmentation, pose tracking requires the framework 100 to learn a more fine-grained feature representation to discriminate different human instances across frames.

In an embodiment, the framework 100 can be adapted to include a keypoint embedding head 300. Unlike the embedding head 116, the keypoint embedding head 300 is designed to learn the discriminative features of different keypoints associated with an instance of an object. A PointSetAnchor defining the keypoint pose for an instance of a given class is defined. For example, a set of 17 keypoints can be defined for the pose of a human object, with the 17 keypoints representing the location of 17 different joints (e.g., neck, shoulder, wrist, etc.) in the human body. The purpose of the keypoint embedding head 300 is to learn an embedding feature that represents the unique set of keypoints for a given instance in an image frame, such that the keypoints associated with each instance can be tracked across a sequence of image frames based on a correlation of the embedding features.

The keypoint embedding head 300 concatenates the set of feature maps from the FPN 110 with a predicted heatmap of the keypoint locations. As shown in FIG. 3, the set of feature maps is also processed by a separate prediction head configured to generate the predicted heat map. This separate prediction head is depicted as a set of convolutional layers 310 (e.g., 4 convolutional layers) followed by an aggregation layer 320. The concatenated input is then fed to the keypoint embedding head 300, which includes an encoder-decoder structure. In an embodiment, the encoder 330 includes one convolutional layer and the decoder includes one de-convolutional layer 340. The encoder-decoder structure predicts the keypoint level embedding features 350. In addition, the heatmap can also be used to identify the location of each keypoint level embedding feature corresponding to a particular joint location.

The same instance contrastive loss term as defined above in Equation 4 is then used to train the keypoint embedding head 300. More specifically, the IC loss calculation is repeated 17 times corresponding to each of the 17 keypoints. In addition, the IC loss calculation can also be applied to the average embedding feature of all keypoints for a given instance. The keypoint embedding head 300 can be added to a classification head and a shape regression head as described in more detail in Wei et al., "Point-Set Anchors for Object Detection, Instance Segmentation and Pose Estimation," Eur. Conf. Comput. Vis., 2020, which is incorporated by reference herein in its entirety.

Instance tracking or pose tracking can be incorporated into various application architectures. Instance tracking is particularly useful in autonomous driving applications. For example, being able to identify and track hazards (e.g., other cars, pedestrians, etc.) captured with one or more image sensors located on the vehicle can help significantly with collision-avoidance algorithms and increases the safety factor of the self-driving feature. Instance tracking or pose tracking may also be useful in other applications such as security (e.g., tracking people on a casino floor) or sports (e.g., tracking player movement on a field).

The machine learning framework 100 is typically implemented as a computer program executed by one or more processors. For example, each layer of the fully connected network can be implemented on a processor such as a central processing unit (CPU) or a parallel processing unit (PPU) such as a graphics processing unit (GPU) or vector processing unit (VPU). In some embodiments, the machine learning framework can be implemented as a service accessible via a network (e.g., cloud-based). In other embodiments, the machine learning framework can be implemented in a local computer system, such as on a desktop computer, mobile device, or autonomous vehicle. A more detailed description of an exemplary system for implementing at least part of the machine learning framework is set forth below.

Parallel Processing Architecture

Figure 4:
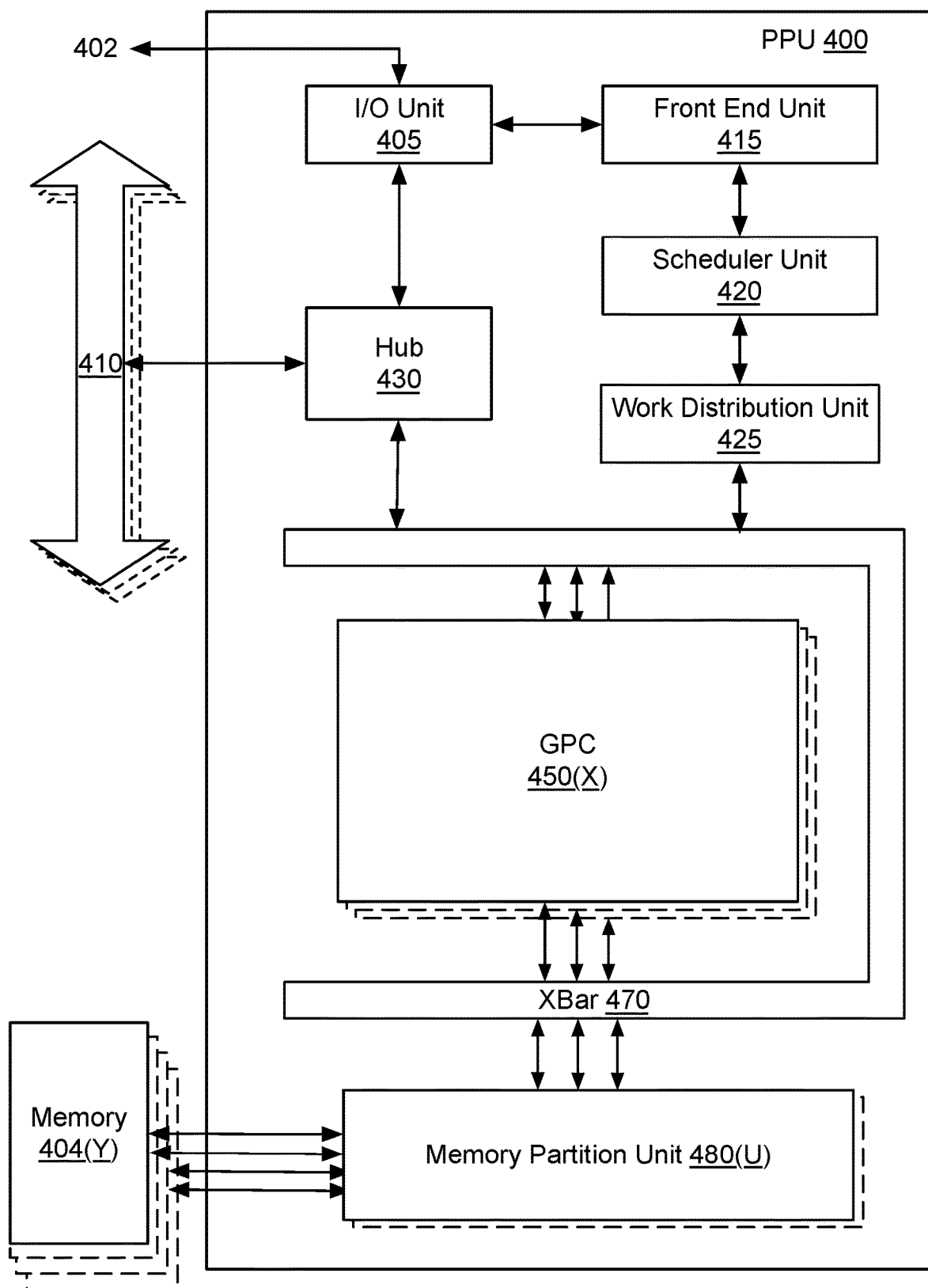
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement any portion of the method 200, set forth above. For example, the PPU 400 may be utilized to generate the image embeddings by executing instructions for encoding the image frames. In addition, the PPU 400 can be used to process at least one of the image embeddings or the video embeddings to produce the outputs of the machine learning framework described above.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
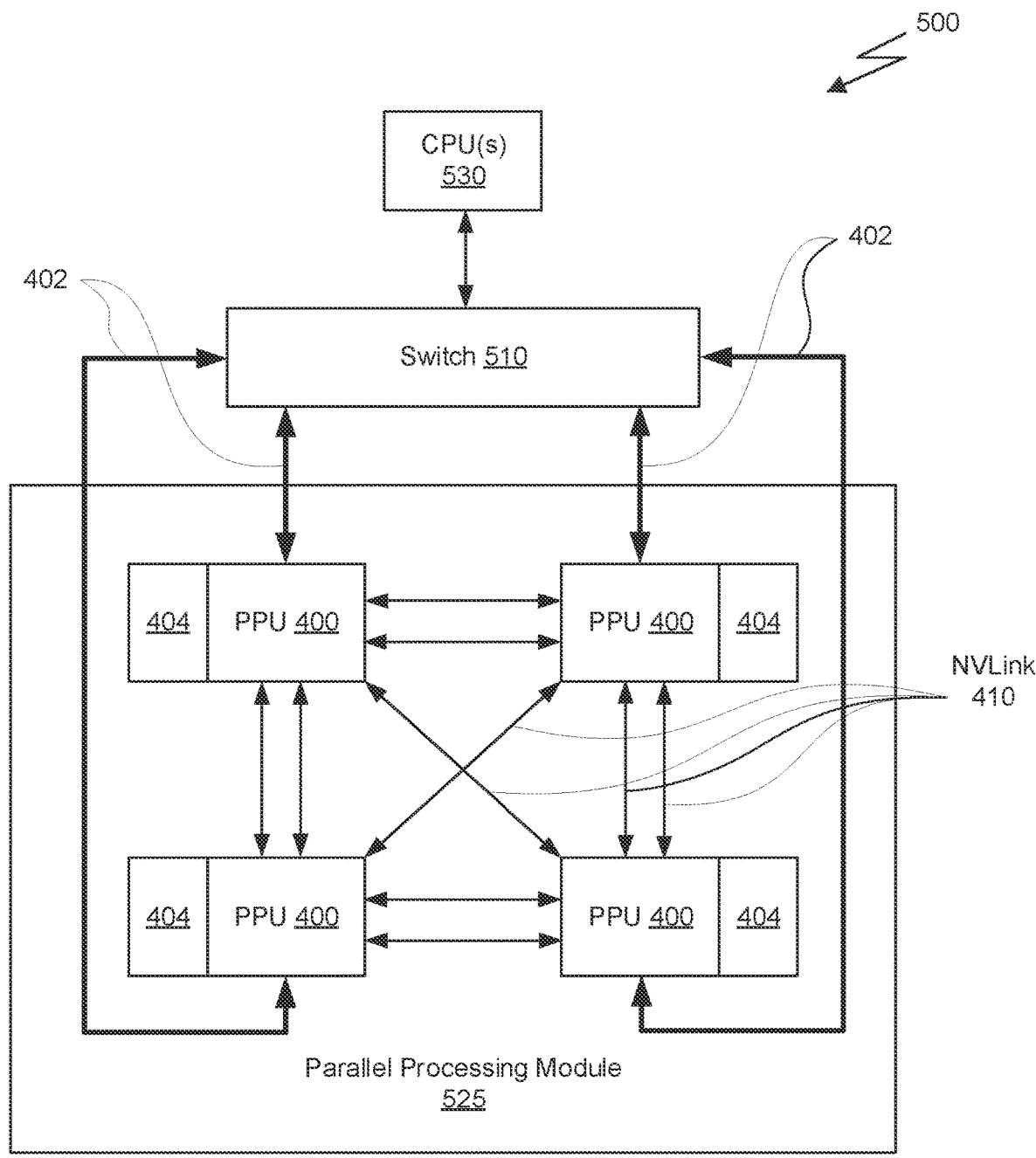
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method(s) shown in FIG. 2. The processing system 500 includes a CPU 530, switch 510, and multiple PPUs 400, and respective memories 404.

Figure 5B:
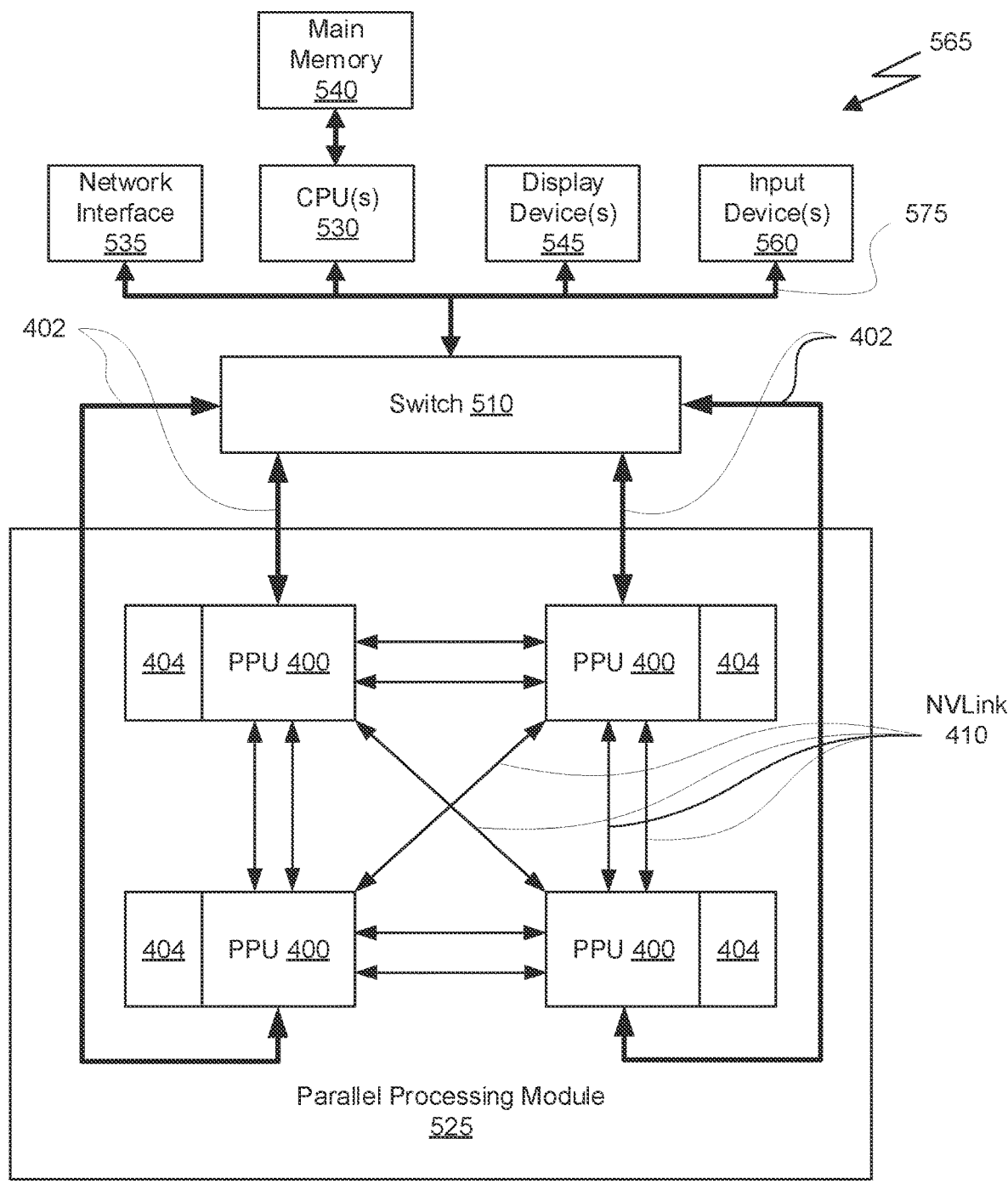
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method(s) shown in FIG. 2.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
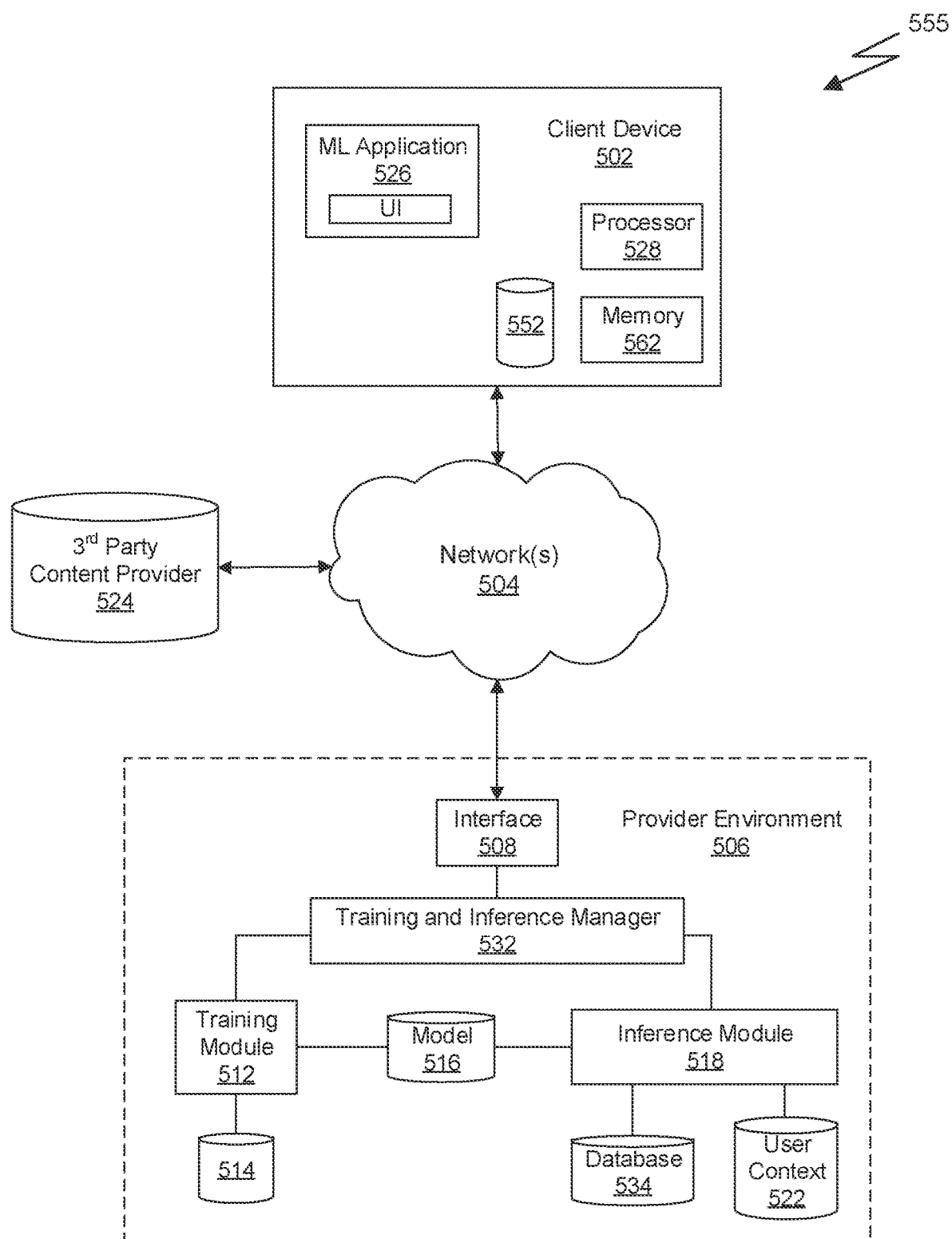
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system

565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy.

In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
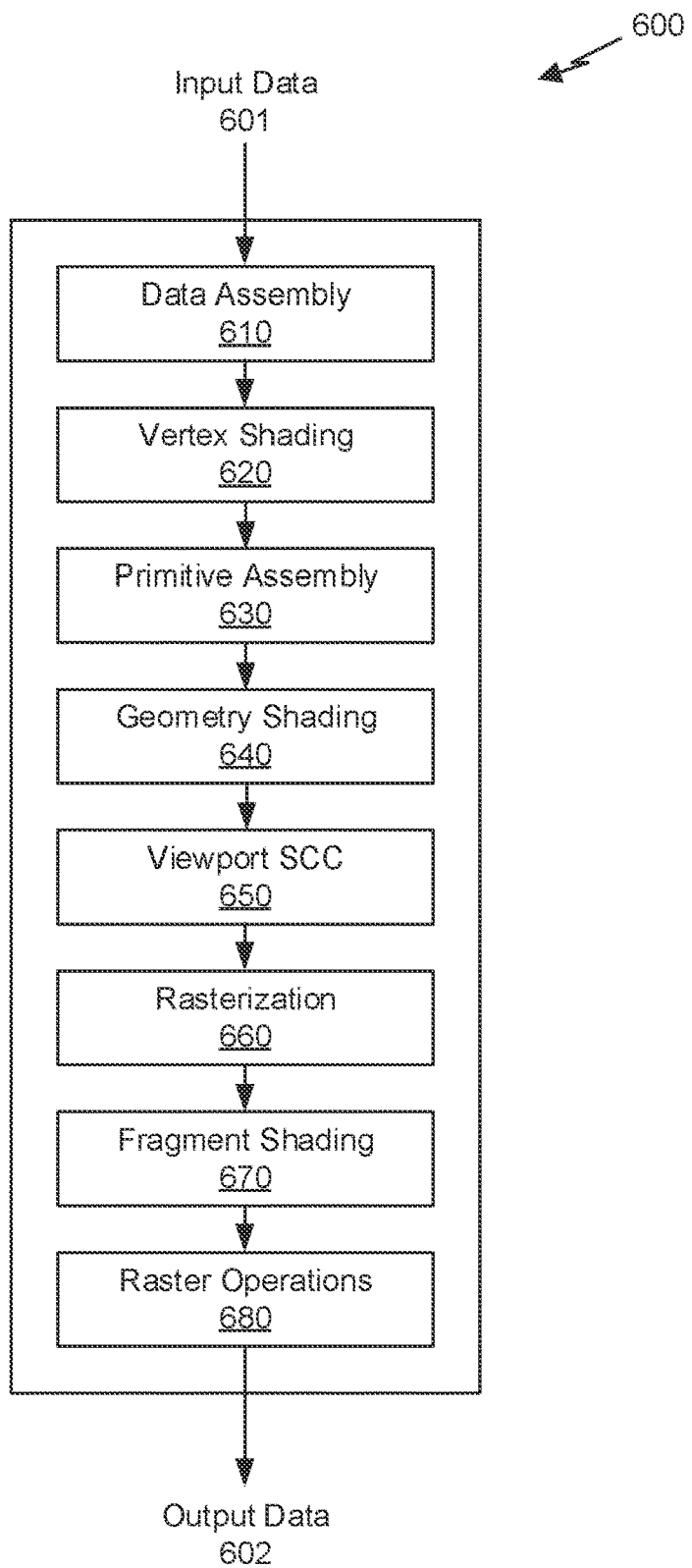
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., $<x, y, z, w>$) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6B:
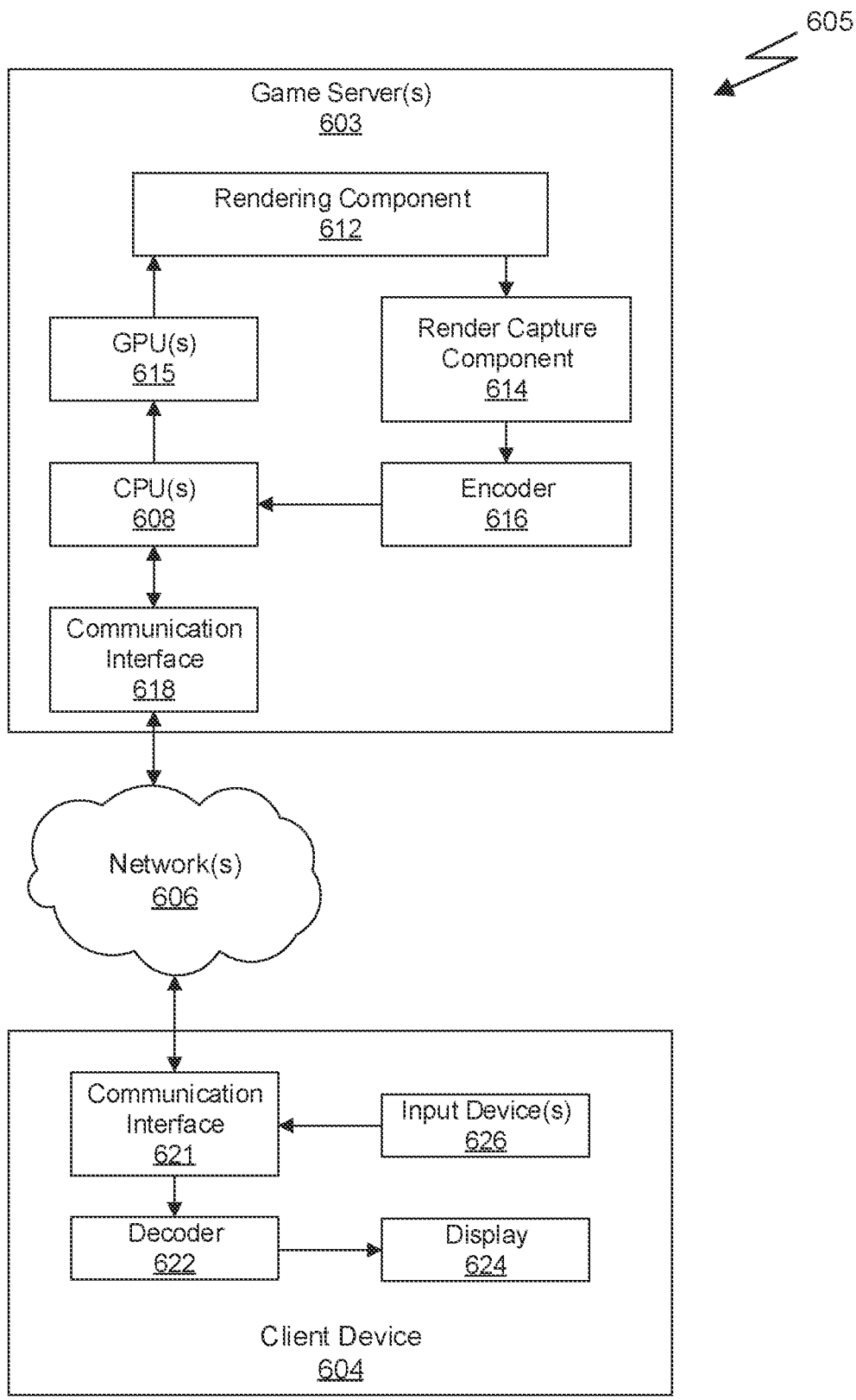
FIG. 6B illustrates an exemplary game streaming system suitable for use in implementing some embodiments of the present disclosure.

FIG. 6B is an example system diagram for a game streaming system 605, in accordance with some embodiments of the present disclosure. FIG. 6B includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for tracking instances of objects within a sequence of video frames, the method comprising:
processing a first frame from the sequence of video frames by a backbone network to generate a first set of feature maps;
processing a second frame from the sequence of video frames by the backbone network to generate a second set of feature maps;
generating, by an embedding head, a first set of embedding vectors, wherein the embedding head generates the first set of embedding vectors by processing the first set of feature maps, wherein each embedding vector of the first set of embedding vectors corresponds to an instance of an object identified in the first frame;
generating, by the embedding head, a second set of embedding vectors, wherein the embedding head generates the second set of embedding vectors by processing the second set of feature maps, wherein each embedding vector of the second set of embedding vectors corresponds to an instance of an object identified in the second frame; and
generating, by a prediction head, a first predicted heatmap of keypoint locations for the first frame and a second predicted heatmap of keypoint locations for the second frame, wherein the prediction head generates the first predicted heatmap by processing the first set of feature maps and the prediction head generates the second predicted heatmap by processing the second set of feature maps,
wherein the embedding head comprises a keypoint embedding head including an encoder-decoder structure, wherein the encoder-decoder structure includes an encoder comprising a convolutional layer and a decoder comprising a de-convolutional layer.

2. The method of claim 1, further comprising processing the set of feature maps by a classification head and a shape regression head configured to provide a pose estimation for each instance of an object based on a plurality of keypoints.

3. The method of claim 1, further comprising:
concatenating the first predicted heatmap of keypoint locations and the first set of feature maps to produce first keypoint embedding head input;
concatenating the second predicted heatmap of keypoint locations and the second set of feature maps to produce second keypoint embedding head input;
generating, by the keypoint embedding head by processing the first keypoint embedding head input, a first set of keypoint embedding vectors;
generating, by the keypoint embedding head by processing the second keypoint embedding head input, a second set of keypoint embedding vectors; and
analyzing the first set of keypoint embedding vectors and the second set of keypoint embedding vectors to perform pose tracking of an instance of an object.

4. A method for tracking instances of objects within a sequence of video frames, the method comprising:
processing a first frame from the sequence of video frames by a backbone network to generate a first set of feature maps;
processing a second frame from the sequence of video frames by the backbone network to generate a second set of feature maps;
generating, by an embedding head, a first set of embedding vectors, wherein the embedding head generates the first set of embedding vectors by processing the first set of feature maps, wherein each embedding vector of the first set of embedding vectors corresponds to an instance of an object identified in the first frame;
generating, by the embedding head, a second set of embedding vectors, wherein the embedding head generates the second set of embedding vectors by processing the second set of feature maps, wherein each embedding vector of the second set of embedding vectors corresponds to an instance of an object identified in the second frame; and
comparing a first center representation, obtained by averaging embedding vectors from the first set of embedding vectors, to a second center representation, obtained by averaging embedding vectors from the second set of embedding vectors, to establish a one-to-one correlation between the instance of the object in the first frame and the instance of the object in the second frame.

5. The method of claim 4, further comprising:
predicting, by a classification head, a location of instances of objects in the first frame and the second frame; and
predicting, by a mask head, a pixel level segmentation mask for each instance of an object identified in the first frame and for each instance of an object identified in the second frame.

6. The method of claim 4, wherein the backbone network comprises a feature pyramid network, wherein the first set of feature maps comprises a first plurality of feature maps of different spatial resolutions, and wherein the second set of feature maps comprises a second plurality of feature maps of different spatial resolutions.

7. The method of claim 4, further comprising training the embedding head using a set of annotated image frames and/or a plurality of sequences of unlabeled video frames.

8. The method of claim 7, wherein training the embedding head comprises minimizing an instance contrastive loss term.

9. The method of claim 8, wherein training the embedding head further comprises enforcing maximum entropy regularization for a similarity matrix.

10. The method of claim 7, wherein training the embedding head comprises minimizing a cycle loss term calculated based on a forward affinity matrix and a reverse affinity matrix corresponding to a sequence of video frames.

11. The method of claim 4, wherein the comparing the first center representation to the second center representation comprises computing a similarity value for the first center representation and the second center representation.

12. The method of claim 11, wherein the similarity value is a cosine similarity value.

13. A system for tracking instances of objects within a sequence of video frames, comprising:
a non-transitory computer-readable memory; and
at least one processor configured to:
implement a plurality of neural networks including:
a backbone network configured to:
process a first frame from the sequence of video frames to generate a first set of feature maps, and
process a second frame from the sequence of video frames to generate a second set of feature maps, and
an embedding head configured to:
generate, by processing the first set of feature maps, a first set of embedding vectors, each embedding vector of the first set of embedding vectors corresponding to an instance of an object identified in the first frame, and generate, by processing the second set of feature maps, a second set of embedding vectors, each embedding vector of the second set of embedding vectors corresponding to an instance of an object identified in the second frame, and compare a first center representation, obtained by averaging embedding vectors from the first set of embedding vectors, to a second center representation, obtained by averaging embedding vectors from the second set of embedding vectors, to establish a one-to-one correlation between the instance of the object in the first frame and the instance of the object in the second frame.

14. The system of claim 13, wherein the plurality of neural networks further comprises:
a classification head configured to predict a location of instances of objects in the first frame and the second frame; and
a mask head configured to predict a pixel level segmentation mask for each instance of an object identified in the first frame and for each instance of an object identified in the second frame.

15. The system of claim 13, wherein the embedding head comprises a keypoint embedding head including an encoder-decoder structure, wherein the encoder-decoder structure includes an encoder comprising a convolutional layer and a decoder comprising a de-convolutional layer.

16. The system of claim 15, wherein the plurality of neural networks further comprises a classification head and a shape regression head configured to estimate a pose estimation for each instance of an object based on a plurality of keypoints.

17. The system of claim 13, wherein the backbone network comprises a feature pyramid network, wherein the first set of feature maps comprises a first plurality of feature maps of different spatial resolutions, and wherein the second plurality of feature maps comprises a second plurality of feature maps of different spatial resolutions.

18. The system of claim 13, wherein the embedding head is trained using a set of annotated images and/or a plurality of sequences of unlabeled video frames.

19. The system of claim 13, wherein training the embedding head comprises minimizing an instance contrastive loss term and enforcing maximum entropy regularization for a similarity matrix.

20. The system of claim 13, wherein training the embedding head comprises minimizing a cycle loss term calculated based on a forward affinity matrix and a reverse affinity matrix corresponding to a sequence of video frames.

21. The system of claim 13, wherein the at least one processor comprises a parallel processing unit.

22. The system of claim 13, wherein the system is included in an autonomous vehicle.

23. The system of claim 13, wherein the at least one processor is configured to compare the first center representation to the second center representation by computing a similarity value for the first center representation and the second center representation.

24. A non-transitory computer-readable medium storing instructions that, responsive to execution by one or more processors, cause a computing system to track instances of objects within a sequence of video frames by:
processing a first frame from the sequence of video frames by a backbone network to generate a first set of feature maps;
processing a second frame from the sequence of video frames by the backbone network to generate a second set of feature maps;
generating, by an embedding head, a first set of embedding vectors, wherein the embedding head generates the first set of embedding vectors by processing the first set of feature maps, wherein each embedding vector of the first set of embedding vectors corresponds to an instance of an object identified in the first frame;
generating, by the embedding head, a second set of embedding vectors, wherein the embedding head generates the second set of embedding vectors by processing the second set of feature maps, wherein each embedding vector of the second set of embedding vectors corresponds to an instance of an object identified in the second frame; and
comparing a first center representation, obtained by averaging embedding vectors from the first set of embedding vectors, to a second center representation, obtained by averaging embedding vectors from the second set of embedding vectors, to establish a one-to-one correlation between the instance of the object in the first frame and the instance of the object in the second frame.

25. The non-transitory computer-readable medium of claim 24, wherein the comparing the first center representation to the second center representation comprises computing a similarity value for the first center representation and the second center representation.

* * * * *